(12) United States Patent
De Zaeytijd et al.

(10) Patent No.: US 12,061,844 B2
(45) Date of Patent: Aug. 13, 2024

(54) GEOMETRY-BASED DETAIL PROPAGATION IN CAD MODELS

(71) Applicant: BRICSYS NV, Ghent (BE)

(72) Inventors: Jürgen De Zaeytijd, Merelbeke (BE); Tjerk Gauderis, Ghent (BE); Sam Degheldere, Ghent (BE)

(73) Assignee: BRICSYS NV, Ghent (BE)

( * ) Notice: Subject to any disclaimer, the term of this patent is extended or adjusted under 35 U.S.C. 154(b) by 682 days.

(21) Appl. No.: 17/263,483

(22) PCT Filed: Aug. 19, 2019

(86) PCT No.: PCT/EP2019/072177
§ 371 (c)(1),
(2) Date: Jan. 26, 2021

(87) PCT Pub. No.: WO2020/038901
PCT Pub. Date: Feb. 27, 2020

(65) Prior Publication Data
US 2021/0165928 A1    Jun. 3, 2021

(30) Foreign Application Priority Data

Aug. 20, 2018    (EP) .................................. 18189646

(51) Int. Cl.
*G06F 30/10*    (2020.01)
*G06F 16/901*    (2019.01)
(Continued)

(52) U.S. Cl.
CPC .......... *G06F 30/13* (2020.01); *G06F 16/9024* (2019.01); *G06F 30/10* (2020.01);
(Continued)

(58) Field of Classification Search
CPC .......... G06F 30/10; G06F 30/00; G06F 30/23; G06F 30/13; G06F 30/12; G06F 2111/20; G06F 30/17
See application file for complete search history.

(56) References Cited

U.S. PATENT DOCUMENTS 5,838,328 A * 11/1998 Roller ..................... G06F 30/17
715/255
6,219,049 B1 * 4/2001 Zuffante ................. G06F 30/00
715/764
(Continued)

OTHER PUBLICATIONS

Bricsys (hereinafter Parabuild), YouTube Video, "Structural Modeling in BricsCAD BIM", Nov. 9, 2017, URL: www(dot)youtube(dot)com/watch?v=vffPpJX9Z-0 (Year: 2017).*
(Continued)

*Primary Examiner* — Boris Gorney
*Assistant Examiner* — David A Hopkins
(74) *Attorney, Agent, or Firm* — Maschoff Brennan

(57) ABSTRACT

Computer-implemented detail propagation in a CAD model is disclosed. A detail and a reference base set comprising N≥1 reference base solids are obtained via user selection. A detail volume to be replicated, encompassing the detail, is automatically computed. The detail volume comprises a surface and for each reference base solid a reference intersection curve of the surface and the reference base solid. A candidate base set comprising N candidate base solids comprising properties compatible with the reference base solids is automatically searched for. The detail volume is automatically mapped onto the candidate base set via a transformation. The mapping of the detail volume is automatically validated via the reference intersection curves. The detail volume is replicated, or replicating of the detail volume is suggested to a user via a visualization means, to (Continued)

replace the corresponding volume at the candidate base set according to the validated mapping.

18 Claims, 10 Drawing Sheets

(51) Int. Cl.
  *G06F 30/12* (2020.01)
  *G06F 30/13* (2020.01)
  *G06F 30/17* (2020.01)
  *G06F 111/20* (2020.01)
(52) U.S. Cl.
  CPC .............. *G06F 30/12* (2020.01); *G06F 30/17* (2020.01); *G06F 2111/20* (2020.01)

(56) References Cited

U.S. PATENT DOCUMENTS

| | | | | |
|---|---|---|---|---|
| 6,385,563 | B1* | 5/2002 | Vora | G06T 19/00 703/6 |
| 6,844,877 | B1* | 1/2005 | Rajkumar | G06F 30/17 345/420 |
| 6,859,201 | B1* | 2/2005 | Singh | G06T 19/20 345/420 |
| 7,010,473 | B1* | 3/2006 | Singh | G06T 17/00 703/2 |
| 2002/0107673 | A1* | 8/2002 | Haller | G06F 30/00 703/1 |
| 2003/0076356 | A1* | 4/2003 | Kohls | G06T 19/20 715/764 |
| 2008/0259077 | A1* | 10/2008 | Liepa | G06F 30/00 345/423 |
| 2013/0311450 | A1* | 11/2013 | Ramani | G06V 30/1988 707/722 |
| 2013/0317786 | A1* | 11/2013 | Kuhn | G06F 30/13 703/1 |
| 2014/0121801 | A1* | 5/2014 | Taguchi | G05B 19/41805 700/98 |
| 2014/0278274 | A1 | 9/2014 | Odsher | |
| 2016/0179986 | A1* | 6/2016 | Clarysse | G06F 30/00 703/1 |
| 2016/0350335 | A1* | 12/2016 | Rorato | G06T 17/20 |
| 2017/0169135 | A1 | 6/2017 | Kumar | |
| 2019/0244114 | A1* | 8/2019 | Nonclercq | G06F 30/18 |

OTHER PUBLICATIONS

Bai, Jing, et al. "Semantic-based partial retrieval of CAD models for design reuse." 2009 SIAM/ACM joint conference on geometric and physical modeling. 2009. See the abstract and figures 1, 3-4, and 6 (Year: 2009).*

Eftekharian, Ata A., Charlie Manion, and Matthew I. Campbell. "Geometric Reasoning for Assembly Planning of Large Systems." International Design Engineering Technical Conferences and Computers and Information in Engineering Conference. vol. 55850. American Society of Mechanical Engineers, 2013. (Year: 2013).*

Giannini, Franca, Katia Lupinetti, and Marina Monti. "Identification of similar and complementary subparts in B-rep mechanical models." Journal of Computing and Information Science in Engineering 17.4 (2017): 041004. See the abstract and §§ 3, 4.2 (Year: 2017).*

Li, Min, Y. F. Zhang, and J. Y. H. Fuh. "Retrieving reusable 3D CAD models using knowledge-driven dependency graph partitioning." Computer-Aided Design and Applications 7.3 (2010): 417-430. See the abstract and §§ 5-5.1 (Year: 2010).*

Lupinetti, Katia, et al. "Multi-criteria retrieval of CAD assembly models." Journal of Computational Design and Engineering 5.1 (2018): 41-53. See the abstract (Year: 2018).*

McWherter, David, et al. "Database techniques for archival of solid models." Proceedings of the sixth ACM symposium on Solid modeling and applications. 2001. See the abstract and § 3.1 (Year: 2001).*

Min, Li. "Similarity Assessment and Retrieval of CAD Models." (2011). National University of Singapore. PhD Dissertation. See the abstract, and §§ 1.2.2, 2.2, 3-3.1, 3.2, 4, 4.3-4.4, 5-5.1, 5.3, 5.4, 5.4.3, 6.1.1-6.1.2, 6.3-6.3.2 (Year: 2011).*

Parabuild, blog post: "Parabuild version 4 release notes", Dec. 2017, URL: www(dot)parabuild(dot)com/parabuild-version-4-release-notes/ for "Propagate . . . " (Year: 2017).*

Nallamothu, Phani Teja. "Design and Implementation of Automated Assembly Planning Methodology." (2013). Master's Thesis, The Pennsylvania State University, see pp. 19-21 (Year: 2013).*

Piñera, J. Keneth. Design of database for automatic example-driven design and assembly of man-made objects. Diss. Massachusetts Institute of Technology, 2013. See pp. 14-16 (Year: 2013).*

Rucco, Matteo, et al. "CAD assembly retrieval and browsing." Product Lifecycle Management and the Industry of the Future: 14th IFIP WG 5.1 International Conference, PLM 2017, Seville, Spain, Jul. 10-12, 2017, Revised Selected Papers 14. Springer International Publishing, 2017. See the abstract, § 3 (Year: 2017).*

Rui, et al. "An effective subpart retrieval approach of 3D CAD models for manufacturing process reuse." Computers in industry 67 (2015): 38-53. See the abstract, and §§ 3-5 (Year: 2015).*

Xu, Changhong, et al. "NC process reuse oriented effective subpart retrieval approach of 3D CAD models." Computers in Industry 90 (2017): 1-16. See the abstract, see §§ 3.2 and 5. (Year: 2017).*

Wang, Yanzhen, et al. "Symmetry hierarchy of man-made objects." Computer graphics forum. vol. 30. No. 2. Oxford, UK: Blackwell Publishing Ltd, 2011. See the abstract, see p. 290, col. 2 (Year: 2011).*

Welzl (1991), "Smallest enclosing disks (balls and ellipsoids)", In: Maurer, H. (eds) New Results and New Trends in Computer Science. Lecture Notes in Computer Science, vol. 555. Springer, Berlin, Heidelberg, 1991: 359-370.

Serrano (1991), "Automatic dimensioning in design for manufacturing", https://doi.org/10.1145/112515.112568.

* cited by examiner

GEOMETRY-BASED DETAIL PROPAGATION IN CAD MODELS

TECHNICAL FIELD

The invention pertains to the technical field of computer-aided design (CAD) models, and preferably building information models (BIMs).

BACKGROUND

US 2017/0 169 135 A1 discloses a replication method for use within CAD software which, according to the abstract, ignores parametric requirements and instead searches 3D geometry of components mated to a replication candidate that are identical to those on which the candidate is constrained.

In relation to a particular embodiment, US 2017/0 169 135 A1 discloses that the user may select a piston subassembly as the seed instance (replication candidate) and a crankshaft instance as the search scope (component). The mate of the piston to the crankshaft is identified, and additional matching faces exist. With replication, additional piston subassembly instances are created and mated to the matching faces.

However, the disclosed methods are not adapted for co-replication of required component modifications for mating a replication candidate. The disclosed methods are also not adapted for efficiently scanning a CAD model in case multiple components are mated with a single replication candidate. The disclosed methods are also not adapted for detecting conflicts within the CAD model. The disclosed methods are not adapted to detect non-identical but related components to which related replication candidates can be mated.

The present invention aims to resolve at least some of the problems mentioned above.

SUMMARY OF THE INVENTION

In a first aspect, the present invention provides a computer-implemented method (CIM) for detail propagation in a computer-aided design (CAD) model, according to claim 1.

In a second aspect, the present invention provides a computer system for detail propagation in a CAD model, whereby the computer system is configured for performing the CIM according to the first aspect of the present invention.

In a third aspect, the present invention provides a computer program product (CPP) for detail propagation in a CAD model, whereby the CPP comprises instructions which, when the CPP is executed by a computer, cause the computer to carry out the CIM according to the first aspect of the present invention.

The present invention is advantageous for several reasons.

The present invention provides for propagation of a detail volume in relation to one or more (reference) base solids onto related similar (candidate) base solids in a CAD model based on local geometry. The detail volume may comprise a detail object and/or local modifications of one or more of the base solids. The present invention is advantageous because the propagation method depends on geometric properties, and does not have to depend on templates, libraries and/or predefined parametrizations.

When modification of a candidate base solid is required for detail propagation, the present method allows to replicate a modification of a reference base solid inside the detail volume onto a corresponding candidate base solid via replication of the entire content of the detail volume.

In an exemplary case to illustrate this advantage, two beams (reference base solids) may be connected via bolts to a joint. The detail to be replicated in this case consists not only of the joint and bolts, but also of the through-holes in the beams for the bolts. The latter represent a modification of the base solids. The detail volume encompasses the detail, i.e. the joint and the bolts, and thereby also the through-holes. Via replication of the entire content of the detail volume, which replaces the corresponding volume at the target location, the through-holes are replicated as well.

When the reference base set comprises multiple reference base solids, the matching of the reference intersection curves of the reference base solids and the detail volume onto the surfaces of the candidate base solids via a transformation provides an efficient way to map the detail volume onto multiple candidate base solids.

Returning to the exemplary case above to illustrate this advantage, a first reference intersection curve of the detail volume can be mapped via a first transformation onto the surface of a first candidate beam which comprises an H-profile. The first candidate beam comprises a first and a second symmetry reflection plane, which intersect in the longitudinal axis of the beam, and a third symmetry reflection plane perpendicular to the longitudinal axis. To map a second reference intersection curve of the detail volume via a second subsequent transformation onto the surface of a second candidate beam, four remaining degrees of freedom of the detail volume are considered for the mapping: mirroring about the first reflection plane, mirroring about the second reflection plane, mirroring about the third reflection plane, and translating along the longitudinal axis.

Via spatial extent of the detail volume, spatial conflicts with solids neighboring the candidate base solids can be easily detected, during or after the mapping of the reference intersection curves.

Via a transformation of the detail volume, whereby a transformation may comprise a translation, a rotation, a reflection, a skewing and/or a scaling, related candidate base solids may be found onto which a related detail volume can be replicated.

DETAILED DESCRIPTION OF THE INVENTION

Figure 1:
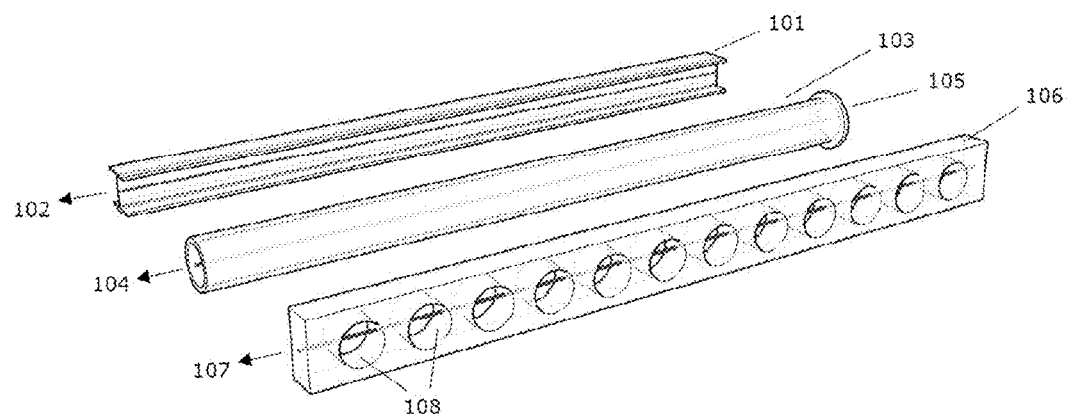
FIG. 1 shows examples of linear solids.

The present invention concerns a computer-implemented method (CIM), a computer system, and a computer program product (CPP) for detail propagation in a computer-aided design (CAD) model. The invention has been summarized in the corresponding section above, and several advantages have been discussed. In what follows, the invention will be described in detail, preferred embodiments are discussed, and the invention will be illustrated by means of non-limitative examples.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

Term Definitions

"A", "an", and "the" as used herein refers to both singular and plural referents unless the context clearly dictates otherwise. By way of example, "a compartment" refers to one or more than one compartment.

"Comprise", "comprising", "comprises" and "comprised of" as used herein are synonymous with "include", "including", "includes" or "contain", "containing", "contains" and are inclusive or open-ended terms that specify the presence of what follows, e.g. a component, and do not exclude or preclude the presence of additional, non-recited components, features, elements, members, steps, known in the art or disclosed therein.

"Based on" as used herein is synonymous with "based at least in part on" and is an inclusive or open-ended term that specifies the presence of what follows (e.g. a component) and does not exclude or preclude the presence of additional, non-recited components, features, elements, members, steps, or the like.

A "computer-aided design model" (CAD model), as used herein, comprises computer-processable data, preferably digital data, about one or more solids, said data representing, or allowing to derive, properties of the solids, such as geometric properties, material properties and/or semantic properties. Said data may also represent, or may allow to derive, relative geometric properties between solids. A CAD model, as used herein, is preferably a building information model (BIM). One of ordinary skill in the art will appreciate that while the present invention preferentially involves a BIM, it may also be used for CAD models in different fields, such as, for example, mechanical engineering.

A CAD model may be viewed and edited via a corresponding CPP, so-called CAD software. A non-limiting list of CAD software comprises 123D, ACIS, Advance Concrete, Advance Design, Advance Steel, AllyCAD, Archi-CAD, AutoCAD, BricsCAD, BRL-CAD, C3D, Caddie, Cadwork, CATIA, Chief Architect, Cobalt, Creo, DataCAD, DesignSpark Mechanical, Digital Project, Drawing Express, FINE MEP, form•Z, FreeCAD, HiCAD, IDEA Architectural, Inventor, IRONCAD, ItelliCAD, KeyCreator, LibreCAD, MEDUSA, MicroStation, Modelur, NanoCAD, NX, OpenCASCADE, OpenSCAD, Parasolid, PTC Creo, PowerCADD, progeCAD, PunchCAD, QCad, Revit Architecture, Revit MEP, Revit Structure, Rhinoceros 3D, RoutCad, SALOME, ShapeManager, SketchUp, Solid Edge, SolidWorks, SolveSpace, SpaceClaim, SpaceClaim Engineer, Tekla Structures, TopSolid, TransMagic, TurboCAD, VariCAD, VectorWorks, and VisualARQ. A non-limiting list of BIM software comprises Allplan, ArchiCAD, ARCHLine.XP, Autodesk Revit, BricsCAD, CodeBook, DDS-CAD, Digital Project, FINE MEP, GRAITEC Advance, IDEA Architectural, MicroStation, Navisworks, OpenStudio, RFEM, Tekla BIMsight, Tekla Structures, Trimble SketchUp, VectorWorks Architect, Vico Office, and VisualARQ.

A non-limiting list of "geometric properties" of a solid comprises a position; an orientation; a dimension, such as a length, a width, a height, a thickness, a diameter, and the like; an inclination, such as with the vertical axis; a direction of a principal axis; and a radius of curvature.

A non-limiting list of "relative geometrical properties" of two solids comprises a relative distance; a relative orientation; a relative position, such as a relative height; a relative angle, such as a relative angle between faces or axes; and a relative size, such as a relative dimension, relative area, or relative volume.

A non-limiting list of "material properties" of a solid comprises a material specification or composition; a tensile strength per area; a melting temperature; a price per volume or weight; and a density.

A non-limiting example of a "semantic property" of a solid is a function classification, such as wall, roof, beam, bolt, shaft, and the like.

A "detail", as used herein, comprises at least one geometric property, namely a position. A detail comprises zero, one or more detail objects. A detail object may be a detail solid. A detail object may be a detail block reference. An example of a detail comprising zero detail objects is a detail boundary between two or more base solids. A detail may further also comprise annotations and the like.

Invention Aspects

In a first aspect, the present invention provides a CIM for detail propagation in a CAD model, comprising several steps. In a second aspect, the present invention provides a computer system for detail propagation in a CAD model, whereby the computer system is configured for performing the CIM according to the first aspect. The computer system comprises one or more processors. In a third aspect, the present invention provides a CPP for detail propagation in a CAD model, preferably a BIM, whereby the CPP comprises instructions which, when the CPP is executed by a computer, cause the computer to carry out the CIM according to the first aspect. The third aspect may further also relate to a tangible non-transitory computer-readable data carrier comprising said CPP. The three aspects of the present invention are hence interrelated. Therefore, all features disclosed in this document, above or below, may relate to each of these aspects, even if they have been disclosed in conjunction with a particular aspect.

The CIM comprises three stages:
- obtaining a detail volume;
- determining a candidate base set, preferably all possible candidate base sets of a target CAD model; and
- mapping the detail volume onto a candidate base set, preferably each candidate base set.

Each stage is discussed below. Several advantages of the present invention have already been discussed in conjunction with the summary of the invention above.

Obtaining a Detail Volume

In a reference CAD model, a detail and a reference base set comprising N reference base solids are obtained via user selection, with N≥1. In the reference CAD model, a detail volume to be replicated is automatically computed. The detail volume encompasses the detail. The detail volume comprises a surface and for each reference base solid a reference intersection curve of the surface of the detail volume and the reference base solid.

Figure 5:
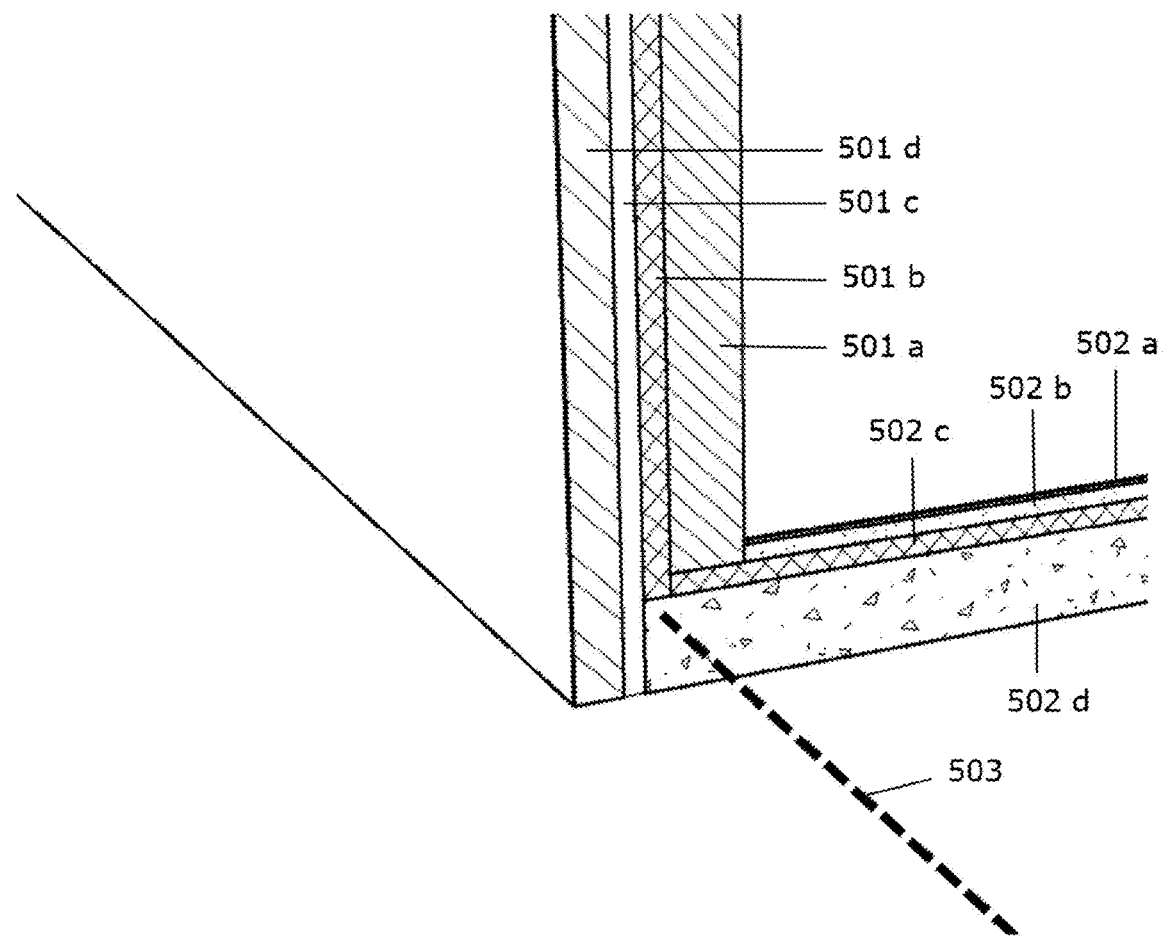
FIG. 5 shows an example of a connection of a wall and a slab.

The detail comprises zero, one or more detail objects. An example of a detail comprising zero detail objects is a detail boundary between two or more reference base solids, such as a 45° miter (detail boundary) in between two perpendicular walls (reference solids) or a particular boundary layer connection (detail boundary) in between a multi-layer wall and a multi-layer slab, cfr. FIG. 5.

The reference base solids of the reference base set are most preferably obtained via direct user selection. The detail may at least in part be obtained directly, via direct user selection of one or more detail objects. The detail may at least in part be obtained indirectly, via direct user selection of the reference base solids and/or a part but not all of the detail objects of the detail. Direct user selection of a solid may be performed, for example, via hovering with a cursor over and clicking on the solid via a computer mouse. One of ordinary skill in the art will appreciate that "hovering over" and "clicking on" involves displaying via a visualization means output comprising a view (top, side, perspective, cross-section, or the like) of at least a part of the solid.

To illustrate various ways to obtain a detail via user selection, the exemplary case of two beams, a joint and bolts is revisited. The two beams of the reference base set are obtained via direct user selection. In a first way, direct user selection of the two beams may result in the automatic identification of the entire detail comprising the joint and bolts. In a second way, direct user selection of the joint of the detail may be performed, whereupon the detail comprising the bolts and through-holes is identified. In a third way, direct user selection of all solids of the detail may be performed, i.e. the joint and bolts.

For a detail comprising zero detail objects, direct user selection of the reference base solids preferably results in the automatic identification of the detail. Referring to the above example of a multi-layer wall and a multi-layer slab, obtaining of the wall and the slab via direct user selection preferably results in the automatic identification of the detail boundary.

Each reference base solid may comprise a set of reference properties. A reference property may be a geometric property, a material property or a semantic property. The reference base set may comprise at least two reference base solids. In the latter case, the reference base set may further comprise a reference relative geometric property.

Automatic identification of (part of) a detail may be based on one or more geometric properties, one or more material properties, one or more semantic properties and/or one or more relative geometric properties of the reference base solids. An example is a relative distance, e.g. for the detail boundary connection in between a multi-layer wall and a multi-layer slab. Another example is a relative dimension, e.g. of a joint with respect to a beam. Yet another example is the semantic classification of two beams being of the type "beam".

The reference intersection curve is adapted for determining upon repositioning of the detail volume whether a candidate intersection of the surface of the repositioned detail volume and a candidate base solid exactly coincides in position, shape and size with the reference intersection curve of a reference base solid and the surface of the detail volume prior to the repositioning. Repositioning may involve a translation and/or a rotation. In what follows, transformations are considered which may comprise a translation, a rotation, a reflection, a point inversion, a scaling and/or a skewing of the detail volume. One of ordinary skill in the art will appreciate that corresponding transformations are performed on the reference intersection curve. For example, when a detail volume comprises a length direction and a reference intersection curve extending in the length direction, an elongation of the detail volume in the length direction causes a corresponding elongation of the reference intersection curve. After such an elongation, the reference intersection curve may 'fit' onto different candidate base solids than prior to the elongation. A reference intersection surface may be determined, being a section, such as a cross-section, of a reference base solid by the surface of the detail volume. The reference intersection surface comprises the reference intersection curve. In this case, the reference intersection curve may comprise an edge of the reference intersection surface.

The present invention concerns two types of detail volumes. A first type of detail volume is three-dimensional. All dimensions of a 3D detail volume are relevant for detail propagation. For example, when multiple beams (reference base solids) are connected via bolts to a joint, the joint and bolts (detail) can be encompassed in a 3D detail volume. Whenever similar beams join under similar angles, they may be connected with a similar joint, and the 3D detail volume can be replicated. A second type of detail volume is two-dimensional and planar, whereby the planar 2D detail volume comprises an extrusion direction perpendicular to the planar 2D detail volume along which the parts of the reference base solids enclosed within the detail volume remain invariant in the extrusion direction over a corresponding extrusion direction. For example, when a multi-layer wall and a multi-layer slab (reference base solids) join along an edge, whereby the layers comprise a particular boundary (detail), i.e. a particular connection structure between the multiple layers, it is desirable to propagate the particular boundary also for walls and slabs comprising similar layers and layer thicknesses, but comprising a different connection length.

The relevant detail volume is in this case a planar 2D detail volume perpendicular to the connection edge (defining the extrusion direction), whereby the wall and slab comprise a part enclosed in the planar 2D detail volume which remains invariant over the connection length (extrusion dimension).

In a preferred embodiment, obtaining said detail volume comprises several steps. A reference base set comprising one or more reference base solids in the reference CAD model is obtained. Preferably, user input is received via at least one user input device indicative of a selection of said one or more reference base solids. Zero, one or more detail objects in the reference CAD model are obtained. Preferably, user input is received via at least one user input device indicative of a selection of zero, one or more detail objects. A user may individually select detail objects and/or reference base solids with a computer mouse. A user may, additionally or alternatively, simultaneously select multiple detail objects and/or reference base solids with a computer mouse. For example, a CAD model may comprise multiple beams connected via a joint and bolts. Via prior selection of the beams as reference base solids and subsequent selection of the joint as detail object, the bolts may automatically be identified as relevant detail objects. For each reference base solid, a reference base detail part is automatically determined. For each reference base solid, a directed bounding box encompassing said reference base solid, all detail objects, and all reference base detail parts is determined. A directed bounding box for a set of objects is a box that encloses the set of objects and comprises an orientation and shape configured for tightly enclosing the set of objects. An intersection of the directed bounding boxes is determined. The detail volume is obtained based on said intersection. In case of a 3D detail volume, the directed bounding boxes are three-dimensional. In this case, the bounding boxes may be cuboids. In case of a 2D detail volume, the directed bounding boxes are preferably two-dimensional and perpendicular to the extrusion direction. In this latter case, the directed bounding boxes may be rectangles. In this latter case, "encompassing" should be understood as encompassing the cross-section.

In a preferred embodiment, when a reference base solid comprises a major axis, such as a longitudinal axis for linear solids or a principal axis, along which the reference base solid extends into the intersection, the intersection is adjusted so that the adjusted intersection comprises a planar reference intersection curve of the surfaces of the adjusted intersection and the reference base solid, whereby the planar reference intersection curve is perpendicular to the major axis. This is advantageous as it allows for an easier mapping of the detail volume (see below).

In a first alternative embodiment, outside of the scope of the present invention, the detail volume may be obtained via user input, i.e. a user may draw the detail volume from scratch. In an embodiment, within the scope of the present invention, an automatically computed detail volume may subsequently be edited via user input, as disclosed below.

In a second alternative embodiment, within the scope of the present invention, the detail volume may be automatically obtained as a cuboid bounding box encompassing the detail. The cuboid may be aligned with the principal axes of the reference CAD model. Alternatively, the cuboid may be aligned with principal axes of the detail, such as the inertial axes of a detail object.

In a third alternative embodiment, within the scope of the present invention, the detail volume may be automatically obtained as a sphere encompassing the detail. The sphere is preferably the smallest sphere encompassing the detail. The smallest sphere may be determined via Welzl's algorithm, as disclosed ("Welzl, E. (1991). Smallest enclosing disks (balls and ellipsoids). In: Maurer, H. (eds) New Results and New Trends in Computer Science. Lecture Notes in Computer Science, vol 555. Springer, Berlin, Heidelberg.").

In a preferred embodiment, the detail objects and the reference base solids are interpreted based on their properties, such as geometric, material and semantic properties, and are classified into one of the following categories: linear solid, planar solid, and compact solid. Based on the classification of the detail objects and the reference base solids, a choice is made between a 3D detail volume and a planar 2D detail volume.

Determining a Candidate Base Set, Preferably all Possible Candidate Base Sets

A candidate base set comprising N candidate base solids comprising properties compatible with the reference base solids of the reference base set is automatically searched for in a target CAD model.

Most preferably, all possible candidate base sets are determined in the target CAD model.

The number N of candidate base solids in the candidate base set is equal to the number N of reference base solids in the reference base set. The target CAD model may be the reference CAD model. The target CAD model may alternatively be a different CAD model.

Each candidate base solid may comprise a set of candidate properties. A candidate property may be a geometric property, a material property or a semantic property. The candidate base set may comprise at least two candidate base solids. In the latter case, the candidate base set may further comprise a candidate relative geometric property.

The reference base set may comprise N reference base solids with N 2. In a preferred embodiment, searching for the candidate base set comprises determining a dimension based on the detail volume, preferably said dimension a maximal dimension, and finding a group of N solids in the target CAD model whereby all possible pairs of solids of the group comprise a distance smaller than said dimension.

In a preferred embodiment, determining the candidate base set, preferably all candidate base sets of the target CAD model, comprises the construction of a connection graph. A connection graph comprising nodes and edges is constructed. Each node represents a solid of the target CAD model. Each edge connects two nodes. Two nodes are interconnected by an edge if the solids represented by the two nodes comprise a distance smaller than said dimension. A clique of size N is identified in the connection graph. Preferably, all cliques of size N are identified in the connection graph. A clique in a graph is a set of completely interconnected nodes. The size of a clique is the number of nodes. A candidate base set is then determined based on an identified clique of size N, also called N-clique. Preferably, all candidate base sets are then determined based on the identified N-cliques.

This is advantageous, as via the connection graph and clique identification, a manageable amount of possible mapping locations can be easily retrieved.

All cliques of size 2 can easily be identified based on the edges of the connection graph. In a preferred embodiment, a clique of size k≥3 is recursively determined via retrieval of two identified cliques of size k−1, which share k−2 nodes, and the subsequent verification that the other two (non-shared) nodes of the two identified cliques are interconnected by an edge in the connection graph.

In a preferred embodiment, a tree data structure comprising a spatial index of all solids of the target CAD model is obtained. Constructing the connection graph in this case involves performing a spatial query on the tree data structure. Preferably, the target CAD model comprises an R-tree, whereby the tree data structure is the R-tree.

In a preferred embodiment, determining said candidate base set comprises the step of pre-filtering solids of the target CAD model on compatibility with all reference properties of at least one reference base solid.

The applicant has found that the recursive clique finding algorithm works well even for large target CAD models, due to the pre-filtering of the connection graph nodes.

In a first alternative embodiment to N-cliques, a search box with linear size based on the determined dimension may be utilized. The solids of the CAD model which overlap with the search box are identified. It is subsequently verified whether the overlapping solids comprise a candidate base set of N candidate base solids comprising properties compatible with the reference base solids of the reference base set. Preferably, the search box comprises a linear size larger than the determined dimension, such as a linear size of two times the determined dimension. Preferably, the search box is translated iteratively over a translation distance. Preferably, the translation distance is equal to at most the linear size minus the determined dimension, such as a translation distance equal to the determined dimension when the linear size is equal to two times the determined dimension. Alternatively to translation of one search box, a plurality of such search boxes, overlapping and with relative displacement based on said translation distance, is utilized. For each translation of the search box, or each search box of the plurality of search boxes, as the case may be, it is verified whether a candidate base set can be retrieved in the with the search box overlapping solids. Preferably, a tree data structure comprising a spatial index of all solids of the target CAD model is obtained. Preferably, solids overlapping with a search box are retrieved by performing a query on the tree data structure. Preferably, the target CAD model comprises an R-tree, whereby the tree data structure is the R-tree.

In a second alternative embodiment to N-cliques, all 'first' solids with properties compatible with a first reference base solid are retrieved. Subsequently, all 'second' solids with properties compatible with a second reference base solid and proximate to a 'first' solid are identified. Proximate may be based on a relative distance of a 'second' solid to a 'first' solid of at most the determined dimension, or an actual relative distance between the first and second reference base solids. In addition to proximity, further relative geometric properties may be verified as well, such as a relative angle for beams, for example. In case the reference base set comprises three or more reference base solids, analogous steps may be performed for the other reference base solids. In this embodiment, the filtering based on proximity and based on individual and/or relative geometric base solid properties is interwoven.

Mapping the Detail Volume onto the (Preferably Each) Candidate Base Set

The detail volume is automatically mapped onto the candidate base set via a transformation. The mapping of the detail volume is automatically validated via the reference intersection curves. Replication of the detail volume, or suggestion to a user of replication of the detail volume via rendering output on a visualization means, to replace the corresponding volume at the candidate base set according to the validated mapping, is then performed.

Most preferably, the detail volume is mapped onto each candidate base set.

Each reference intersection curve is mapped on the surface of a candidate base solid. The mapping of each reference intersection curve on the surface of a candidate base solid allows to validate the mapping of the detail volume onto the candidate base set via the transformation. This stage comprises mapping of the detail volume onto the candidate base set via a transformation and validating the mapping of the detail volume via the mapping of each reference intersection curve on the surface of a candidate base solid. Preferably, the transformation comprises a translation, a rotation, a reflection, a point inversion, a scaling and/or a skewing. The detail volume is replicated, or replicating of the detail volume is suggested to a user, in the target CAD model, according to the validated mapping of the detail volume, to replace the originally present corresponding volume near the corresponding candidate base solids.

In a preferred embodiment, a one-to-one mapping of the reference base solids of the reference base set onto the candidate base solids of the candidate base set is found based on the reference and candidate properties. Otherwise formulated: a one-to-one correspondence between the base solids of the reference and candidate base sets is determined based on the properties of the base solids.

In a preferred embodiment, a one-to-one mapping of the reference base solids of the reference base set onto the candidate base solids of the candidate base set is found based on the reference and candidate relative geometric properties. Otherwise formulated: a one-to-one correspondence between the base solids of the reference and candidate base sets is determined based on relative geometric properties of the base solids.

In a preferred embodiment, mapping the detail volume onto the candidate base set further comprises verifying spatial compatibility of the mapped detail volume with a solid other than the N candidate base solids of the candidate base set.

In a preferred embodiment, a rendering of at least a part of each of the candidate base solids and the mapped detail volume is outputted via a visualization means. This may be performed during suggesting to a user the replication of the detail volume according to the mapped detail volume. This may additionally or alternatively be performed after replicating the detail volume in the target CAD model according to the mapped detail volume.

Transformation

In a preferred embodiment, the transformation is computed as an iterative sequence of partial transformations. First, a one-to-one correspondence between the base solids of the reference and candidate base sets is determined automatically. Hereby, the one-to-one correspondence associates with each reference base solid one of the candidate base solids and vice versa. This association is based on compatibility of properties and/or relative geometric properties of the base solids. A point and direction is automatically determined for each reference base solid of the reference base set. Most preferably, the detail volume encompasses said point, i.e. the point resides within the detail volume or on the surface of the detail volume. Preferably, said point and direction is an arrow. Most preferably, the arrow comprises an arrow point, whereby the detail volume encompasses said arrow point. The transformation is computed as an iterative sequence of partial transformations, i.e. an aggregate of partial transformations. Each partial transformation maps the point and direction of a reference base solid onto a corresponding point and direction of the corresponding candidate base solid, i.e. according to the one-to-one correspondence. One point and direction may be determined and mapped for a reference base solid. Alternatively, more than one point and direction may be determined and mapped for a reference base solid. A further partial transformation thereby most preferably preserves certain constraints met by previous partial transformations.

In an example, a detail volume encompassing a joint and bolts is 'fitted' onto three beams. In this case, the reference base set comprises three reference beams, and the candidate base set comprises three candidate beams. First, a one-to-one correspondence between the beams of the reference and candidate base sets is determined. This is performed bases on properties (geometric, material and/or semantic) of individual base solids (beams). In case all beams would have different profiles, e.g. one beam having an H-profile, one beam having a U-profile, and one beam having an O-profile, this suffices to determine the one-to-one correspondence. In case several beams in the reference base set are similar, relative geometric properties, such as angles between longitudinal axes of the beams, may additionally be used to establish the one-to-one correspondence. A point and direction is determined for each reference beam, which may be performed before, after or during establishing the one-to-one correspondence. For beams, this is preferably a point on a longitudinal axis, such as a longitudinal central, symmetry or inertial axis, and the longitudinal direction. A first partial transformation is then computed mapping the point and direction of a first reference beam onto the longitudinal axis of the corresponding first candidate beam. The constraint to be met is that the point and direction remain aligned with the longitudinal axis. In case of an H-profile, four degrees of freedom remain: translation along the longitudinal axis, reflection about a first symmetry plane (comprising the longitudinal axis) of the H-profile, reflection about a second symmetry plane (comprising the longitudinal axis) of the H-profile, and reflection about a third symmetry plane (perpendicular to the longitudinal axis). In case of a circular O-profile, more degrees of freedom remain: in addition to the above-mentioned ones, also a rotation about the longitudinal axis. The remaining degrees of freedom are then utilized to establish the other partial transformation(s). Upon failure of mapping all points and directions, the candidate base set is discarded, and upon success, the validity is verified via the reference intersection curves.

In certain cases, such as fitting a lamp on a lamp post with an O-profile, for example, degrees of freedom will remain. In such a case, additional constraints are added based on heuristic rules, such as, for example, distance to an outer end of the lamp post, or distance to a slab supporting the lamp post.

Preferably, a partial transformation comprises a rotation and a translation component. Preferably, the rotation component of the partial transformation is computed first, based on the direction, and the translation component is computed subsequently, based on the point.

For linear reference base solids, such as a beam, for example, the point and direction are preferably associated with a longitudinal axis of the linear solid, preferably a longitudinal central, inertial and/or symmetry axis of the linear solid, preferably a point on the longitudinal axis and direction parallel to the longitudinal axis.

For planar reference base solids, such as a wall comprising a major planar face, for example, the point and direction are preferably associated with a normal direction of the major planar face, preferably a point on an edge, a vertex or a center, such as a geometric center, of the major planar face.

For generic reference base solids, preferably multiple points and directions are utilized, preferably whereby each point and direction are associated with a tangent or a normal to an edge or surface, such as the reference intersection curve of the reference base solid with the surface of the detail volume.

The transformation is computed as an iterative sequence of partial transformations. Upon failure of mapping all points and directions, the candidate base set is discarded, and upon success, the validity is verified via the reference intersection curves.

In an alternative or further embodiment, for each reference base solid a point and direction are automatically determined. A corresponding analytical and/or numerical set of constraints based on a parametrized transformation to suitably map all points and directions onto the candidate base set is automatically generated. Solutions for the set of constraints are automatically computed. In case no solutions exist, the candidate base set is discarded.

Further Embodiments

In a further embodiment, after automatic computation of the detail volume in the reference CAD model, the invention may allow for storing a file comprising the detail volume and the reference base solids of the reference base set on a non-transitory computer-readable storage medium. The stored file may be associated via user input with the target CAD model. The detail volume may thereby be "loaded" from the storage medium for the target CAD model, and suitable candidate base sets may then be retrieved in the target CAD model, and corresponding replicas inserted or suggested, as described above. This way, a library comprising a plurality of details may be created. The loading of the detail may be performed via so-called "dragging and dropping" association via user input, or any other suitable command-line or graphical user interface method.

In a further embodiment, the invention may allow for editing via user input of the automatically computed detail volume, before searching for a candidate base set. In case a file is stored as disclosed above, the edited detail volume may be stored. The invention may allow for a flag or checkbox to enable this option. In case it is enabled, an editing window may be prompted via visualization means to a user. In case it is disabled, the user is not prompted.

In a further embodiment, the present invention may allow for automatic generation of a set of geometric parameters for the computed detail volume and/or the reference base solids and/or the detail objects. Suitable numerical values for the geometric parameters may then be automatically determined based on a candidate base set, in order to adapt the detail volume and/or the detail objects for the candidate base set. Preferably, the set of geometric parameters is a non-redundant set of parameters. An example of a geometric parameter is a thickness of a wall or slab, or a thickness of a layer of a multi-layer wall or slab. Another example of a geometric parameter is an angle between two structural elements such as beams. Another example of a geometric parameter is a dimension of a beam profile. In an embodiment, the invention may allow for user input to provide constraints based on one or more geometric parameters of the set. One of ordinary skill will appreciate that the intersection curves vary correspondingly with parameters. For example, to accommodate a slight variation in width of a beam profile, the numerical value of a corresponding parameter may be adjusted. The corresponding reference intersection curve will of course be modified accordingly. The set of geometric parameters may be determined, for example, via methods disclosed in Serrano (SMA '91: Proceedings of the first ACM symposium on Solid modeling foundations and CAD/CAM applications; May 1991 Pages 379-386).

The invention is further described by the following non-limiting example which further illustrates the invention, and is not intended to, nor should it be interpreted to, limit the scope of the invention.

Example

This example pertains to an embodiment of a detail propagation algorithm according to the present invention. The detail propagation algorithm aims at copying modeling details from a location in model space to other locations where the same detail can be applied. In essence, it tries to isolate the detail in 3D space, link it to reference base solids, and find 3D transformations to map the detail to sets of candidate base solids. Informally put, a mapping is successful when the detail seamlessly fits to the candidate base solids.

A modeling detail is defined by:
Reference base solids to which the detail is linked. The configuration of the reference base solids serves as a blueprint to search for other possible application locations.
A 3D or 2D detail volume that isolates the detail. It is connected to all the reference base solids, i.e. it contains a reference base detail part of each reference base solid.
Detail objects: objects such as solids, block references, annotations, and the like that are completely contained within the detail volume. In case of a 2D detail volume, this means that a cross-section of the detail objects in the plane defined by the 2D detail volume is completely contained in the detail volume.

A mapping of a modeling detail to a candidate base set of candidate base solids is defined by:
a one-to-one mapping that links each reference base solid to a candidate base solid in the candidate set; and
a transformation by which a clone of the original detail must be transformed to match the candidate set.

A transformed detail matches a set of candidate base solids when each candidate base solid intersects with the transformed detail volume in the same way as the corresponding reference base solid does with the original detail volume.

Constructing the Detail Volume

Figure 2:
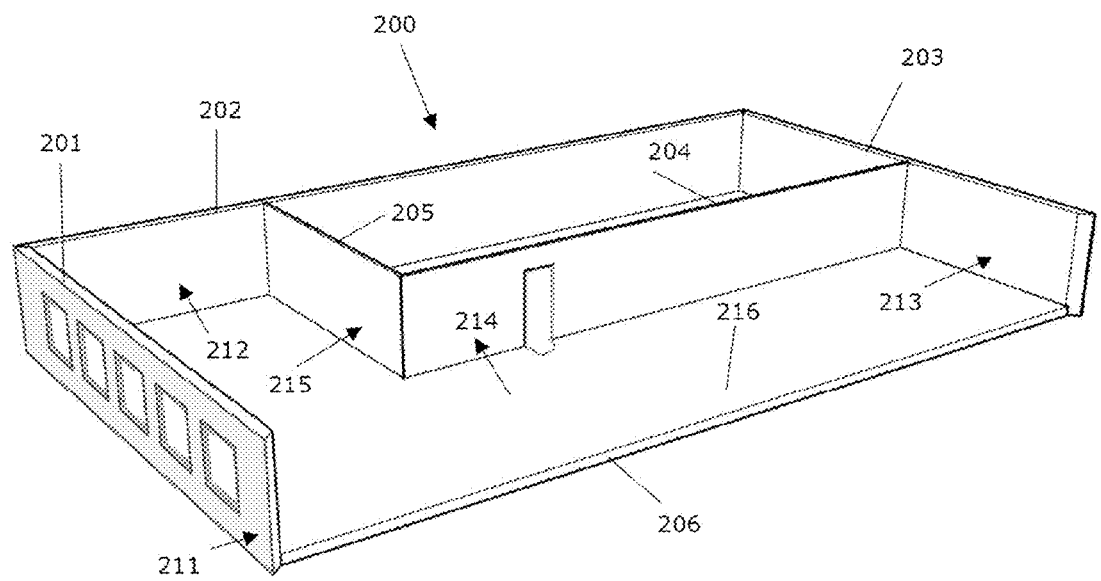
FIGS. 2 and 4 show examples of CAD models comprising planar solids.

Detail objects and reference base solids are geometrically interpreted and classified into the following categories:
Linear solids: Linear solids can be seen as an extrusion of a 2D profile along an axis, possibly with some local details (holes, extensions, and the like). A non-limitative list of examples of linear solids comprises beams, columns, and members. FIG. 1 shows embodiments of a first linear solid (101), a second linear solid (103), and a third linear solid (106). Each of the linear solids comprises an extrusion direction (102, 104, 107). The first linear solid (101) is a beam comprising an H-profile. The second linear solid (103) is a tube comprising a flange (105). The third linear solid (106) is a member comprising a plurality of holes (108).
Planar solids: Planar solids exhibit major planar surfaces, i.e. the majority of the area of a planar solid comprises planar faces that lie in two parallel planes. A non-limitative list of examples of planar solids comprises walls and slabs. FIG. 2 shows an embodiment of a BIM (200) comprising a slab (206) and several walls (201, 202, 203, 204, 205). Each of the slab and the walls are planar solids comprising planar faces (211, 212, 213, 214, 215, 216).
Compact solids: Compact solids are not linear and not planar.

The geometric interpretation may be based on existing BIM classification, geometric heuristics and optionally even auto-classification of solids.

Based on the geometric interpretation and subsequent classification of the detail objects and the reference base solids, a detail can be classified as a 3D detail or as an extruded detail:
In case of a 3D detail, the reference base solids together with the detail objects define a compact region in space.

Figure 3A:
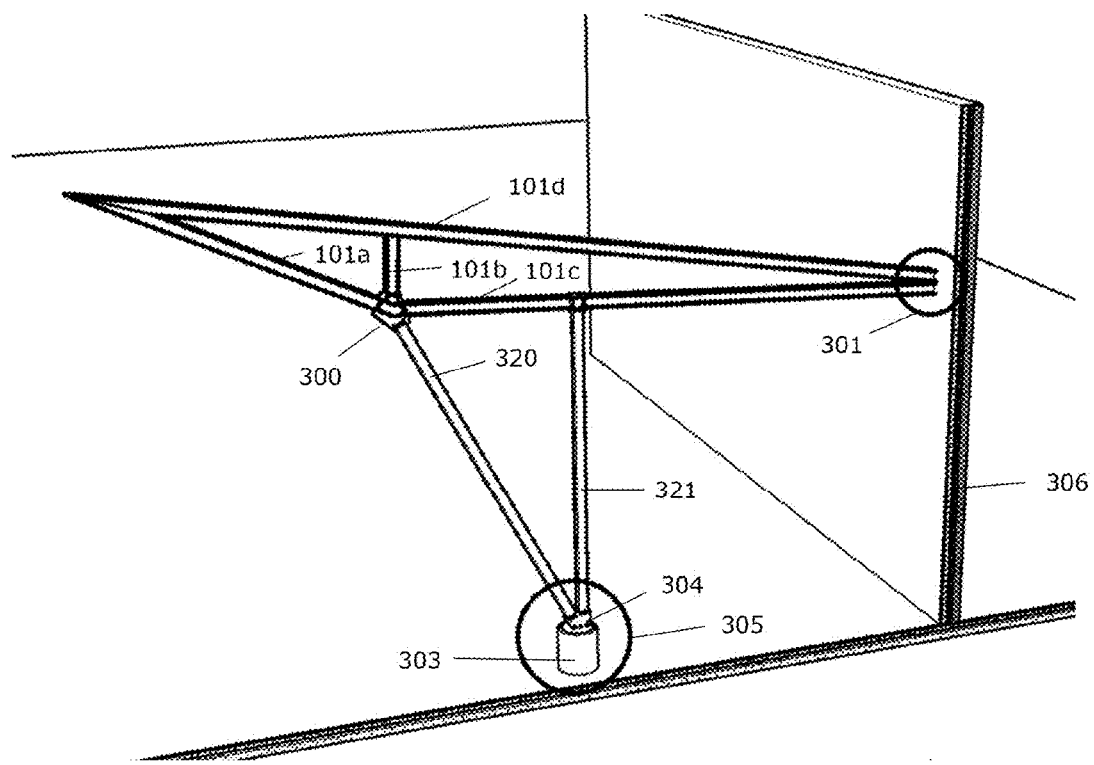
FIGS. 3A and 3B show an example of a CAD model comprising beams and a corresponding detailed view, respectively.
Figure 3B:
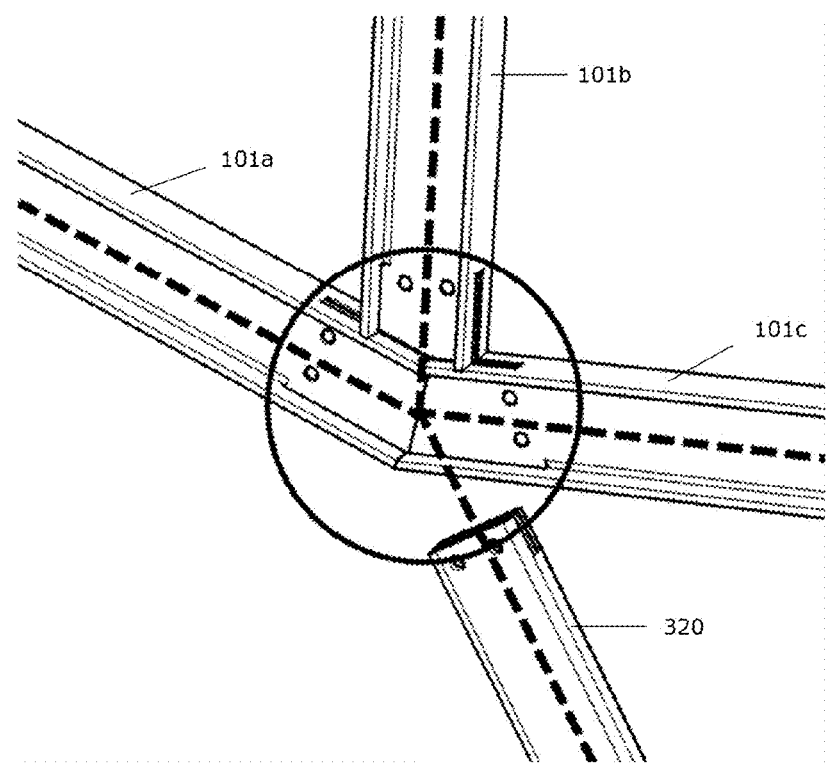
Figure 4:
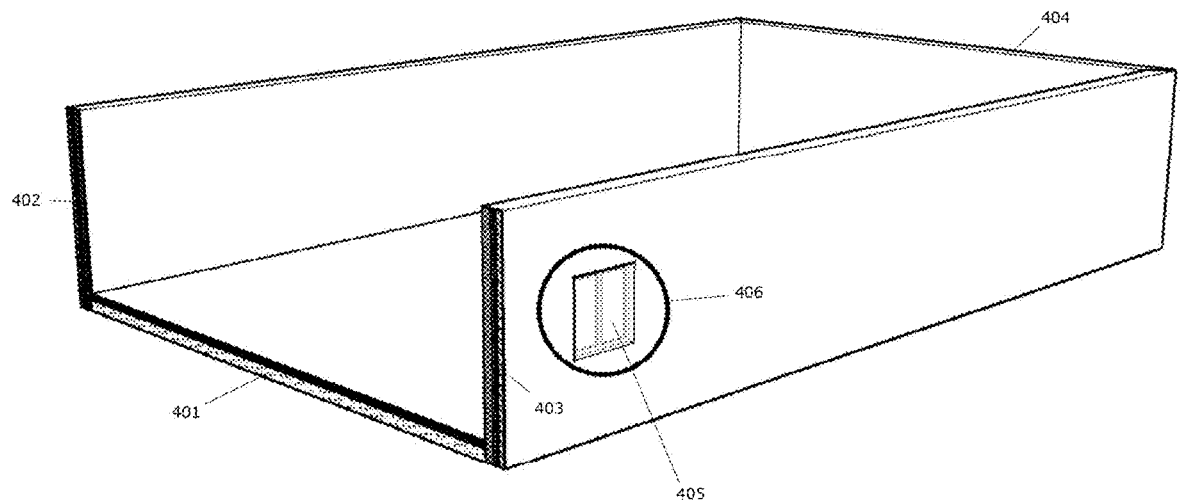

FIG. 3A shows an embodiment of a BIM comprising a slab, a wall (306), and several beams (101*a*, 101*b*, 101*c*, 101*d*, 320, 321). At certain locations (300, 301, 305), multiple beams are proximate and may be interconnected. FIG. 3B shows a detail of FIG. 3A. Three beams comprising an H-profile (101*a*, 101*b*, 101*c*) and a fourth beam (320) are proximate. FIG. 4 shows an embodiment of a BIM comprising a slab (401), walls (402, 403, 404), and a window (405). The window has a compact spatial extent and is an example of a 3D detail.

Figure 6:
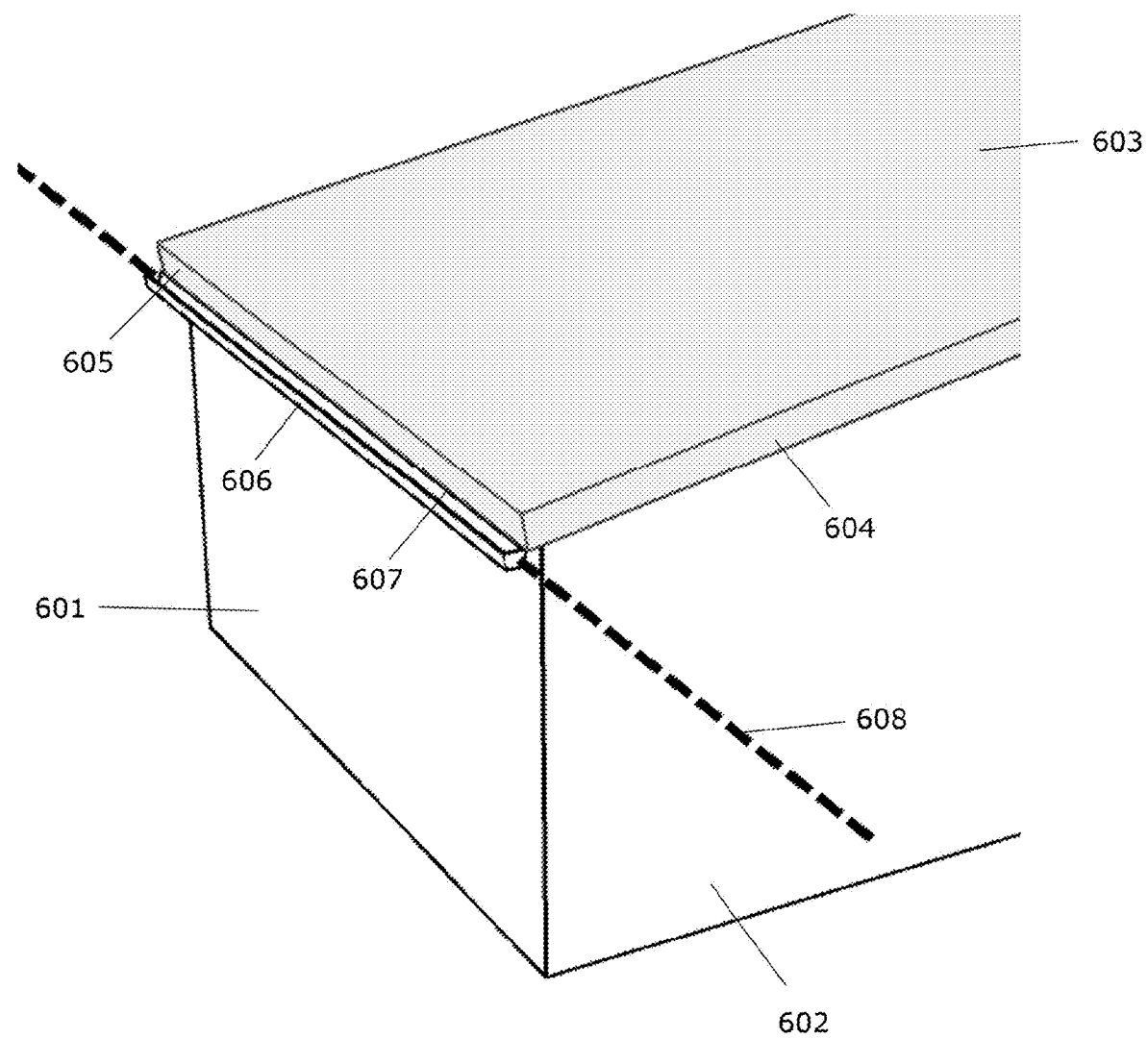
FIG. 6 shows an example of a CAD model comprising a roof and a gutter, comprising in the direction of their connection an extrusion direction.

In case of an extruded detail, the reference base solids together with the detail objects define a line-like region in space. FIG. 5 shows an embodiment of BIM comprising a multi-layer wall (501*a*, 501*b*, 501*c*, 501*d*) and a multi-layer slab (502*a*, 502*b*, 502*c*, 502*d*) which comprise a particular boundary, i.e. a particular interconnection between the layers, which extends over an extrusion direction (503). In this case, it is desirable to propagate the particular boundary also for walls and slabs comprising similar layers and layer thicknesses, but comprising a different connection length. FIG. 6 shows an embodiment of a BIM comprising walls (601, 602) and a roof (603). The roof (603) comprises sides (604, 605). Along a horizontally extending side (605), a gutter (606) is attached to an edge (607) of the side (605). The edge and the side remain invariant along an extrusion direction (608) over an extrusion length. In this case, it is desirable to propagate the particular gutter also for horizontal roof sides comprising a different horizontal dimension.

In case of a 3D detail, the detail volume may be constructed as follows. The minimal parts of the reference base solids which should be part of the detail (reference base detail parts) are determined. Directed bounding boxes of the reference base solids are calculated and extended such that each of them encompasses every detail object and every reference base detail part. All these extended directed bounding boxes are then intersected to obtain a rough detail volume, which is finally trimmed to simplify the geometry.

Figure 7A:
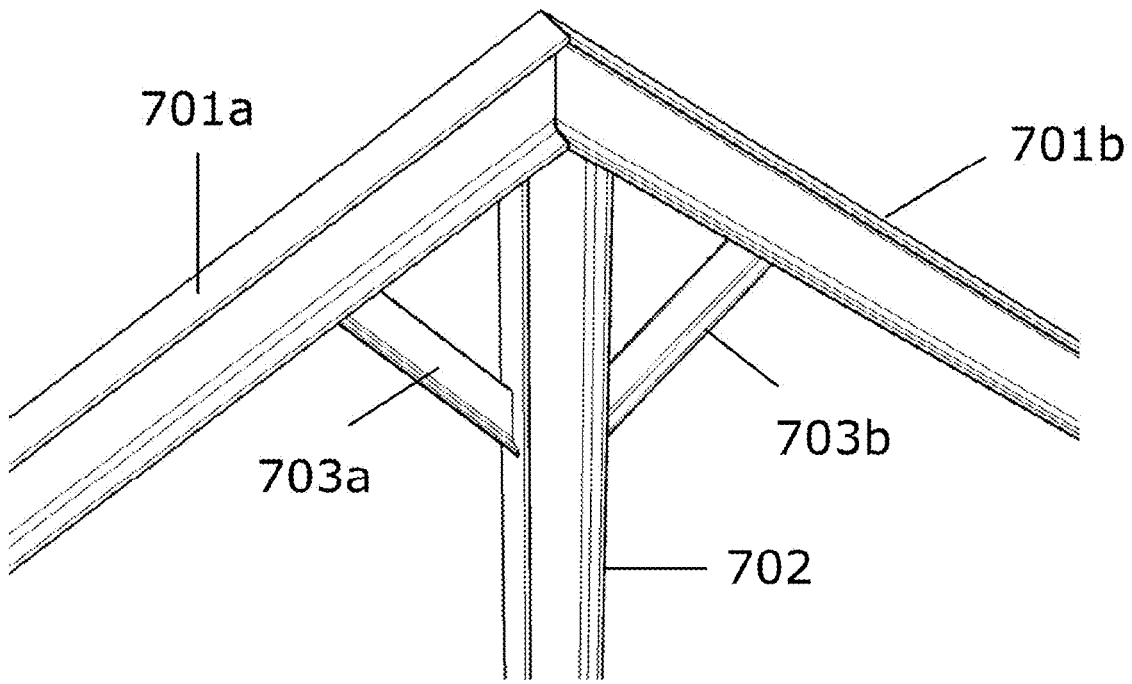
FIGS. 7A, 7B, 7C, 7D and 7E show several beams to illustrate several steps in an embodiment of a determination of a detail volume.
Figure 7B:
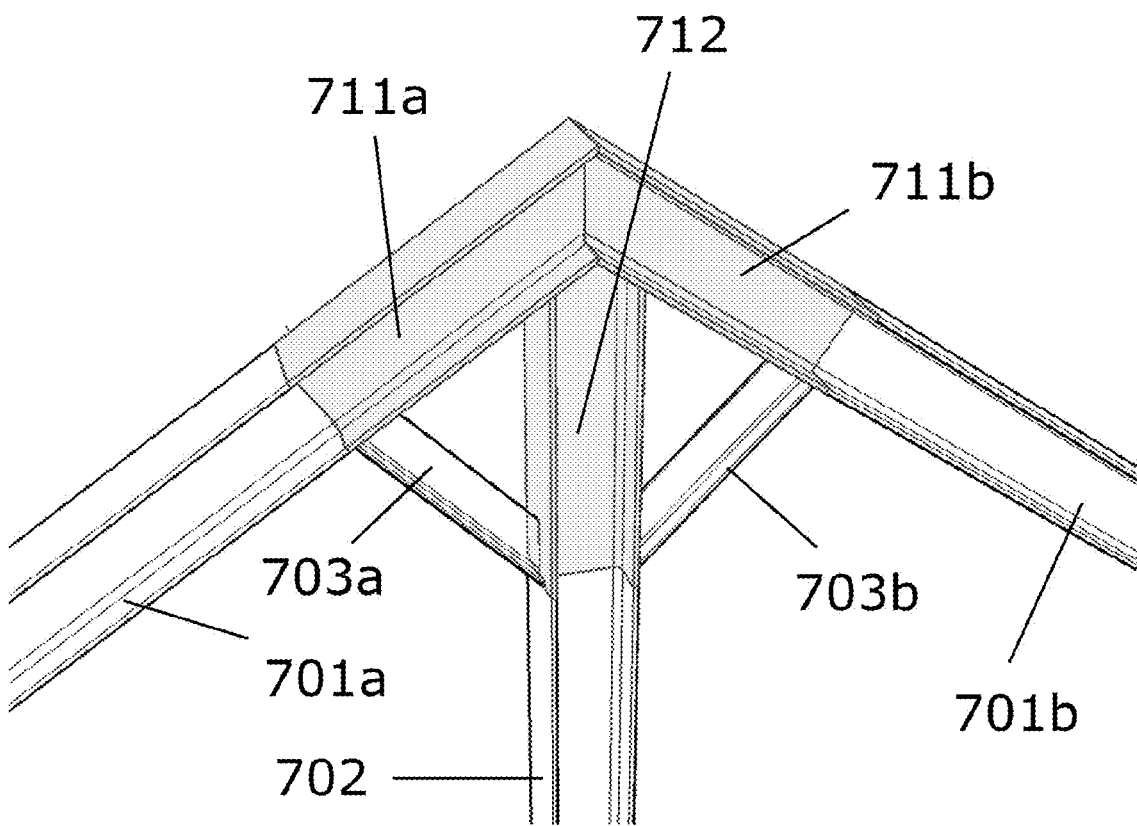
Figure 7C:
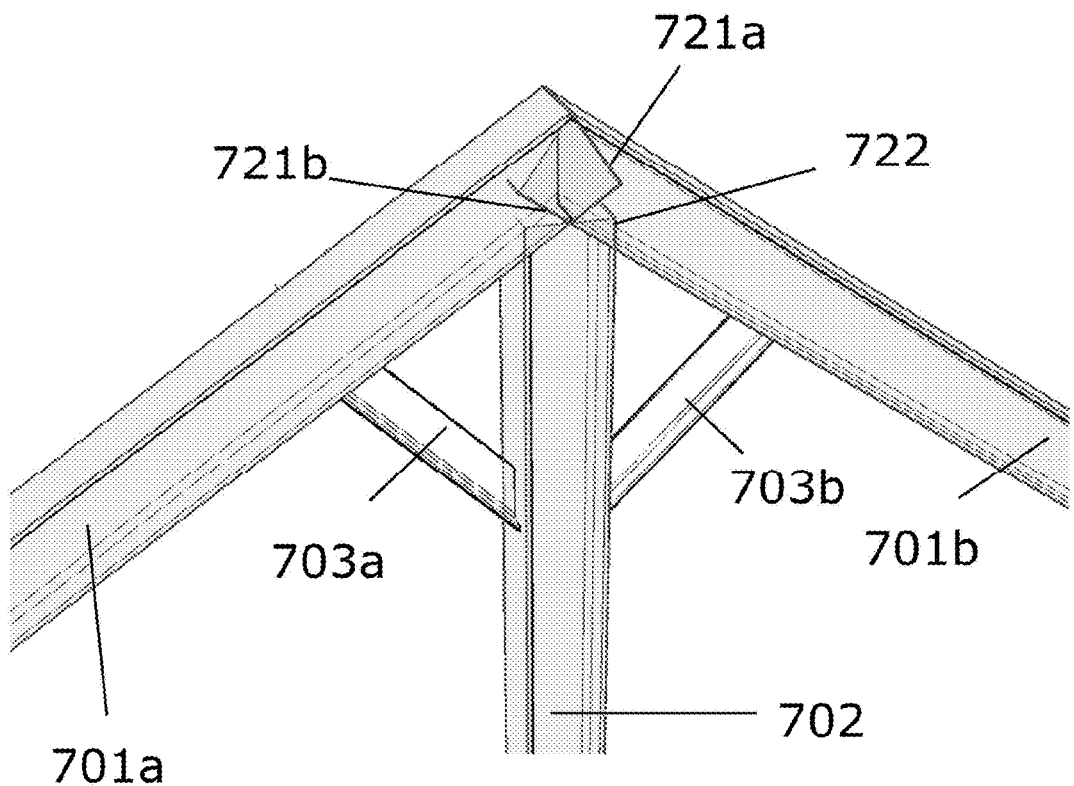
Figure 7D:
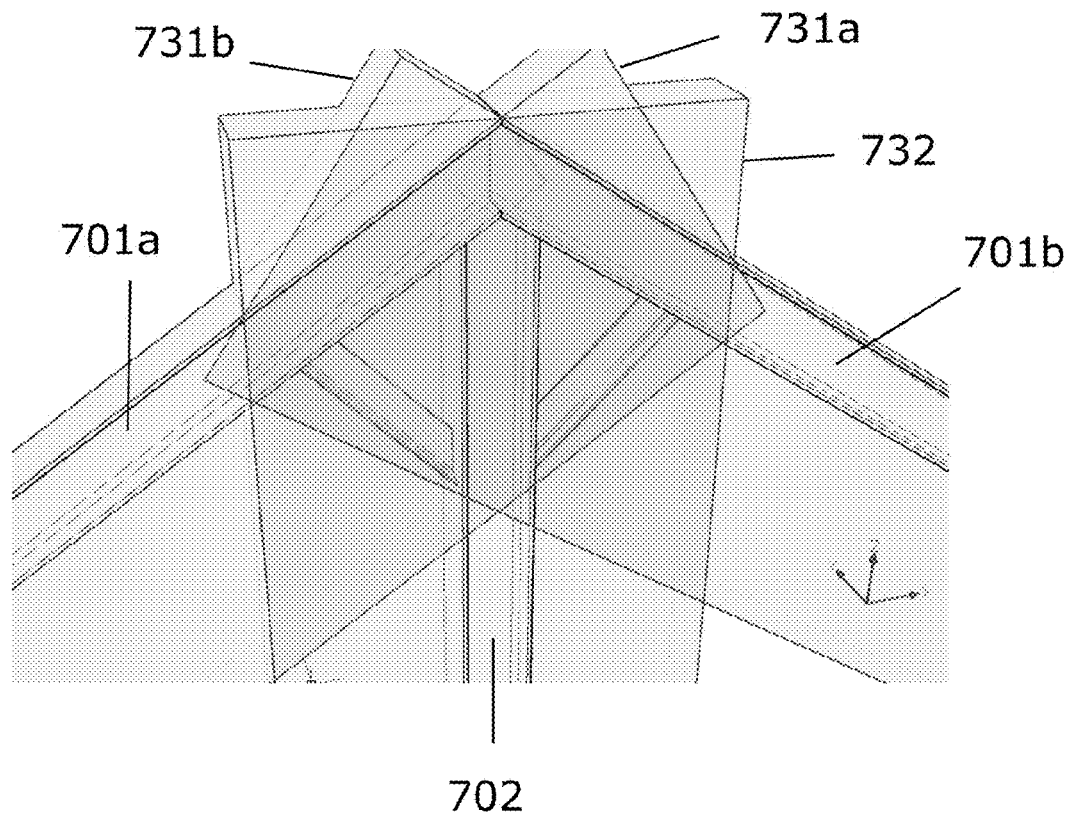
Figure 7E:
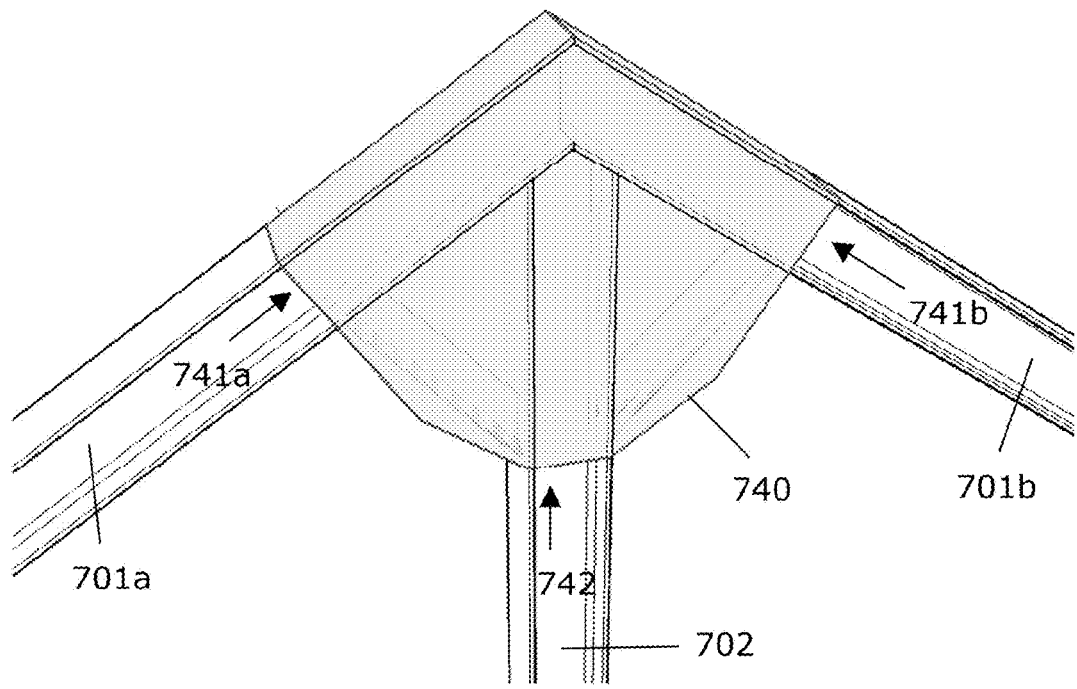

FIGS. 7A to 7E illustrate this process via an example. FIG. 7A shows a first beam (701*a*) and a second beam (701*b*) which are supported by a support beam (702) and connected thereto via a first interconnection beam (703*a*) and a second interconnection beam (703*b*). The reference base set comprises the first beam (701*a*), the second beam (701*b*) and the support beam (702). The detail comprises the interconnection beams (703*a*, 703*b*). In FIG. 7B, for each of the reference base solids, a reference base detail part (711*a*, 711*b*, 712) is indicated. A reference base detail part may be determined based on the location and extent of the detail. In FIG. 7C, for each of the reference base solids, a directed bounding box (721*a*, 721*b*, 722) is indicated. A directed bounding box may be determined based on the principal axes of the reference base solid. The directed bounding boxes are extended so that the extended directed bounding boxes (731*a*, 731*b*, 732) encompass every detail object (703*a*, 703*b*) and every reference base detail part (711*a*, 711*b*, 712), as shown in FIG. 7D. The intersection of all extended directed bounding boxes is determined and subsequently trimmed. The trimmed intersection (740), see FIG. 7E, comprises planar faces (741*a*, 741*b*, 742) perpendicular to the principal axis of the reference base solid along which the reference base solid extends into the trimmed intersection. This trimmed intersection is the detail volume.

In case of an extruded detail, an extrusion axis is determined first. This can e.g. be a line defined by a set of intersecting planar solids or a line parallel to the end of one planar solid, cfr. FIG. 6. Then a representative slice interval is determined along the extrusion axis, i.e. an interval where the 2D cross-section of the detail perpendicular to the extrusion axis does not change. If such an interval is not uniquely defined, a section generated by a user may be used to locate one. Based on this interval, construct a 2D directed bounding box of all reference base solids perpendicular to the extrusion axis and use these 2D directed bounding boxes to construct a planar 2D detail volume in a similar way as for 3D details.

Several mapping features are stored. These are basic geometric entities, calculated per reference base solid, to facilitate the mapping on candidate base solids:

- An outward connection direction: the major characterizing direction for the base solid. For linear solids it is the direction of the axis. For planar solids it is a relevant direction on the reference major surface.
- A secondary direction: to break symmetry around the outward direction if needed. For linear solids, it is one of the main directions of the profile. For planar solids, it is a relevant direction on the reference major surface.
- A connection point that lies inside the detail volume. For linear solids, this is the intersection point with the detail volume. For planar solids in a 3D detail, it is a point on the major surfaces that is most central to the detail. For planar solids in an extruded detail, it is the intersection of the 2D detail volume with the extrusion axis.
- A 2D or 3D reference intersection curve which lies on the surface of the detail volume.

Figure 8:
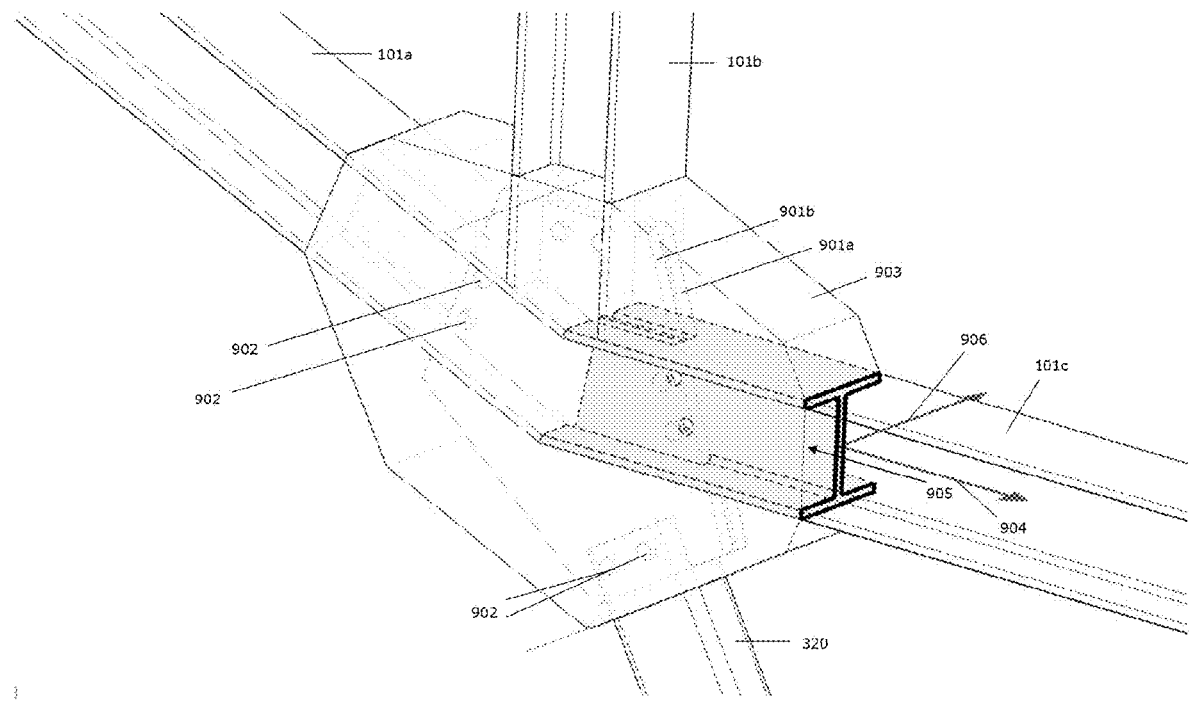
FIGS. 8 and 9 show examples of detail volumes encompassing connection means for several of the beams of FIGS. 3A and 3B.

FIG. 8 shows an example of a joint (901a, 901b) to which four beams (101a, 101b, 101c, 320) are connected via bolts (902). A detail volume (903) has been determined. The detail volume comprises a face (905) comprising a planar reference intersection curve, whereby the face is perpendicular to the principal axis of beam (101c). The outward connection direction (904), parallel to the principal axis and perpendicular to the planar reference intersection curve, and a secondary direction (906) are indicated via arrows which originate from the connection point.

Figure 9:
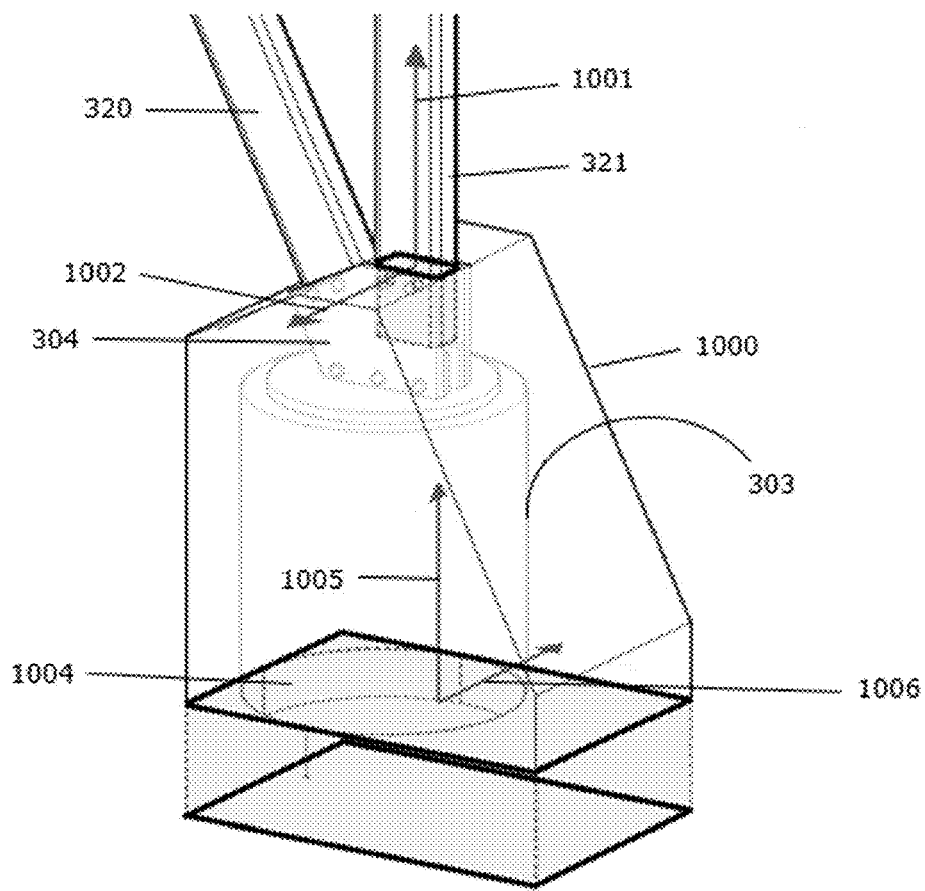

FIG. 9 shows an example of a joint (303, 304) comprising a connection element (304) and a foot (303). The connection element (304) connects two angled beams (320, 321) and the foot (303). The reference base set comprises the two angled beams (320, 321) and the slab (1004). The detail comprises the connection element (304) and the foot (303). A detail volume (1000) has been constructed. For beam (321), an outward connection direction (1001) and a secondary direction (1002) are indicated via arrows which originate from the corresponding connection point. For the slab (1004), an outward connection direction (1005) and a secondary direction (1006) are indicated via arrows which originate from the corresponding connection point. Note that via replication of the detail volume, the recess in the slab will automatically be copied.

Figure 10:
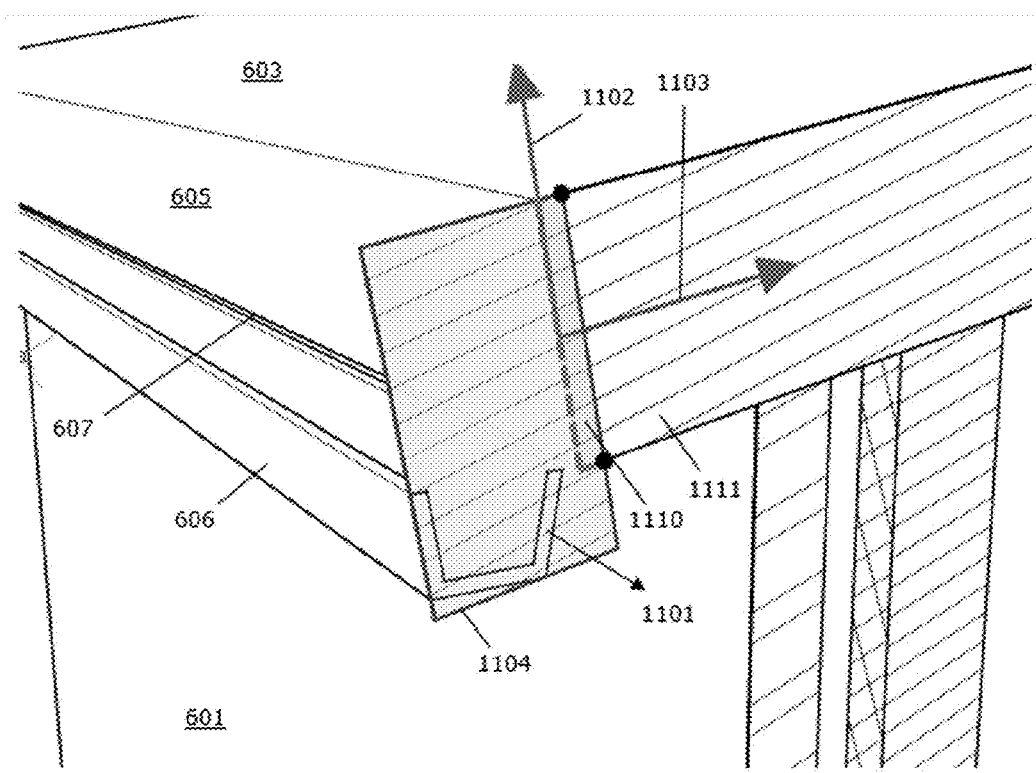
FIG. 10 shows an example of a detail volume for the gutter (detail) connected to the roof (base solid) of FIG. 6.

FIG. 10 shows a cross-section of the BIM in FIG. 6. A planar 2D detail volume (1104) has been constructed, perpendicular to the axis of the gutter, which is parallel to the extrusion direction (1101). The roof (reference base solid) comprises a cross-section (1111) comprising a reference base detail part (1110) inside the planar 2D detail volume (1104). Arrows (1102, 1103) indicate the outward connection and secondary directions.

Search for Candidate Base Solids

A connection graph is built in which the nodes represent possible candidate base solids and in which the edges represent connections between those base solids. The connection criterion is that the base solids are closer to each other than a distance threshold based on the maximal dimension of the detail.

The evaluation of the connection criterion is optimized by using meta-data of the solids such as the axis for linear solids, and major surfaces and directed bounding boxes for planar solids.

The search for connections is optimized using spatial indexing of the candidate solids in 3D space (RTree) and by pre-filtering candidates based on semantic (e.g. BIM type), geometric (e.g. linear vs. planar, relevant dimension, and the like) and material (e.g. composition) properties.

From this connection graph, groups of candidate base solids are obtained by finding all cliques with size equal to the number of original base solids involved in the detail. A clique in a graph is a set of completely interconnected nodes. Such a clique in the connection graph just described, represents a group of base solids that are all sufficiently close to each other to possibly allow joint connection to a transformed copy of the detail volume.

The used clique finding algorithm is a recursive algorithm that finds all cliques of size k when the cliques of size k−1 are known. When two cliques of size k−1 share k−2 nodes and the graph contains the missing edge, a clique of size k can be formed. The algorithm is started with cliques of size 2: these are the edges of the graph. This algorithm performs well even for large models, thanks to the filtering of graph nodes.

Figure 11A:
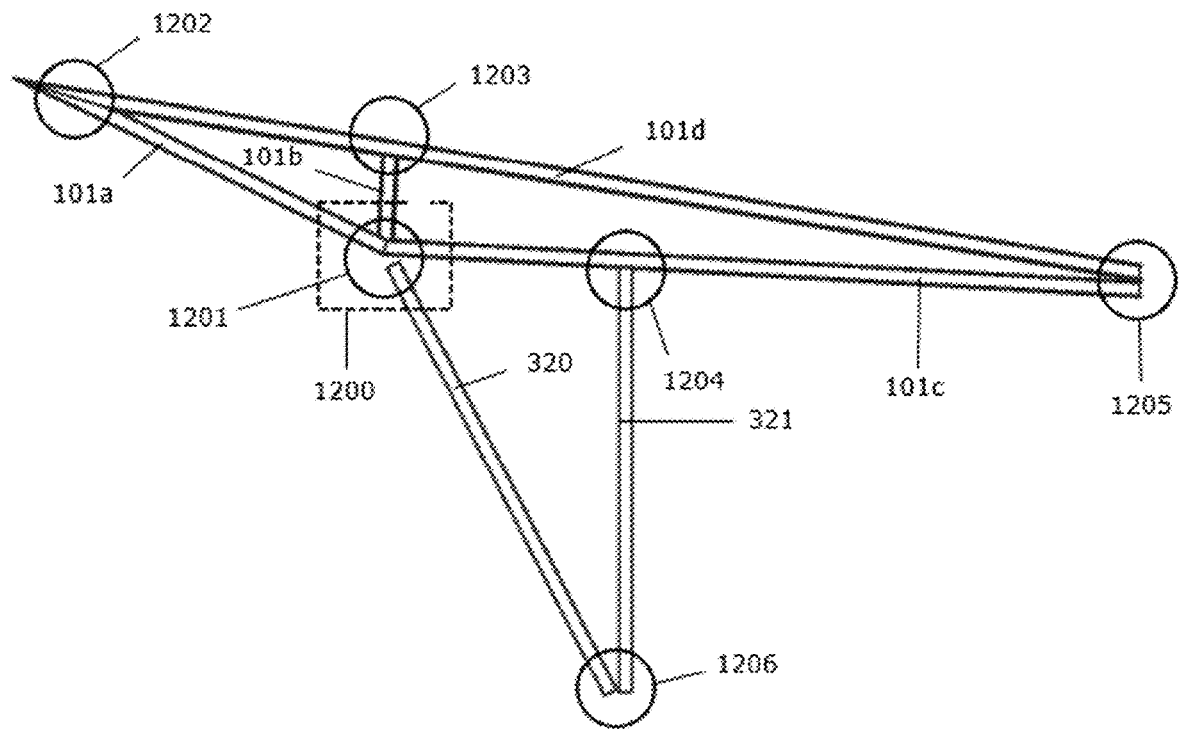
FIG. 11A shows an example, in line with FIG. 3A, of a CAD model comprising several beams, some of which are mutually proximate at certain locations along their longitudinal direction.
Figure 11B:
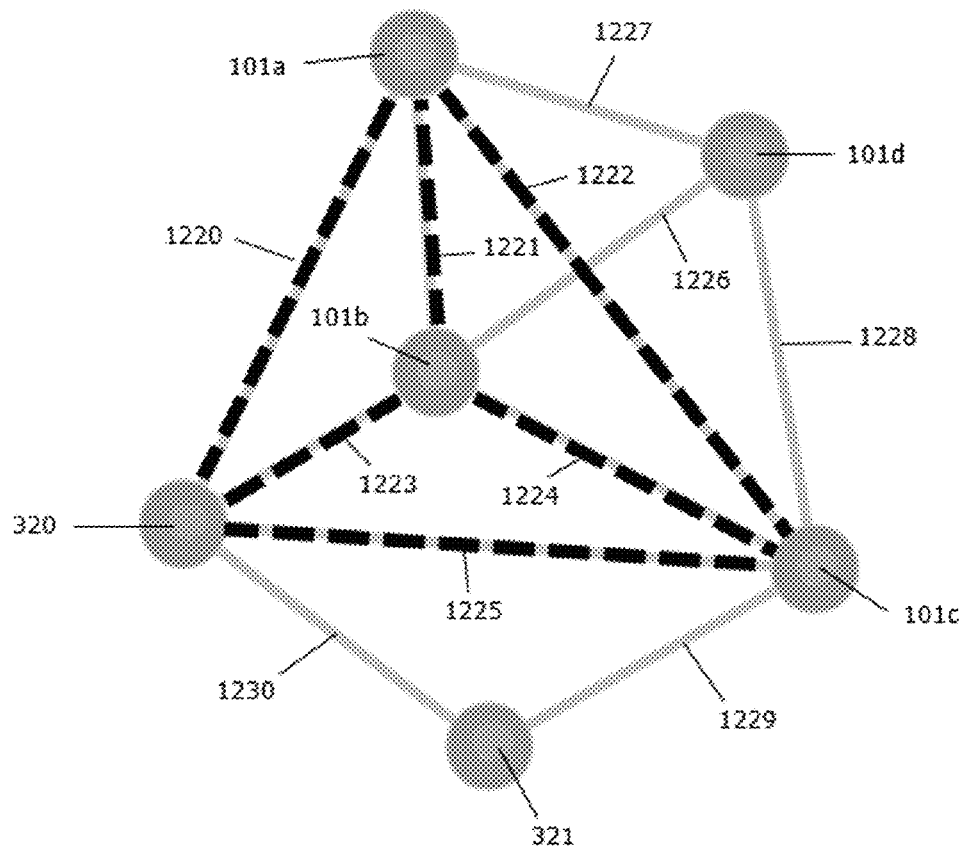
FIG. 11B shows an example of a connection graph corresponding to the beams of FIG. 11A.

FIG. 11A shows the beams (101a, 101b, 101c, 101d, 320, 321) of FIG. 3A, as well as several regions (1201, 1202, 1203, 1204, 1205) where some of them are proximate. In what follows, focus is drawn (1200) on region (1201). FIG. 11B shows a connection graph corresponding to FIG. 11A. Each node represents a corresponding beam, e.g. node 101a' represents beam 101a. When two beams comprise a region where their relative distance is smaller than a detail-based threshold, an edge (1220, 1221, 1222, 1223, 1224, 1225, 1226, 1227, 1228, 1229, 1230) connects the corresponding nodes. The focus region (1200) corresponds to the clique indicated by the dashed edges (1220, 1221, 1222, 1223, 1224, 1225).

Mapping the Detail on the Candidate Base Sets

For each set of candidate base solids, all possible mappings are determined that match the original detail volume to the set. These mappings are found in three stages:

- Find possible one-to-one mappings of the reference base solids on the candidate base solids based on the same semantic, geometric and material properties as those used for filtering the graph. For example, a planar solid of type X with composition Y should be mapped on a candidate planar solid with type X and composition Y.
- For each such one-to-one mapping, determine a transformation that matches the original detail to the candidate set. For this, mapping features are determined for the candidate solids and the transformation should map each mapping feature of a reference base solid onto the mapping feature of the mapped candidate solid. When there is some freedom left, heuristic choices are made to choose appropriate directions or locations (e.g. when mapping a 3D detail onto a single planar solid, a choice of organizing mapped details in different grids on the candidate solid remains).
- For each found mapping and associated transformation, check whether the intersection curve of the transformed detail volume with the candidate solids exactly matches the transformed reference intersection curve stored on the detail.

For an extruded detail, the planar 2D detail volume must be extruded after it has been mapped to a target location.

Figure 12A:
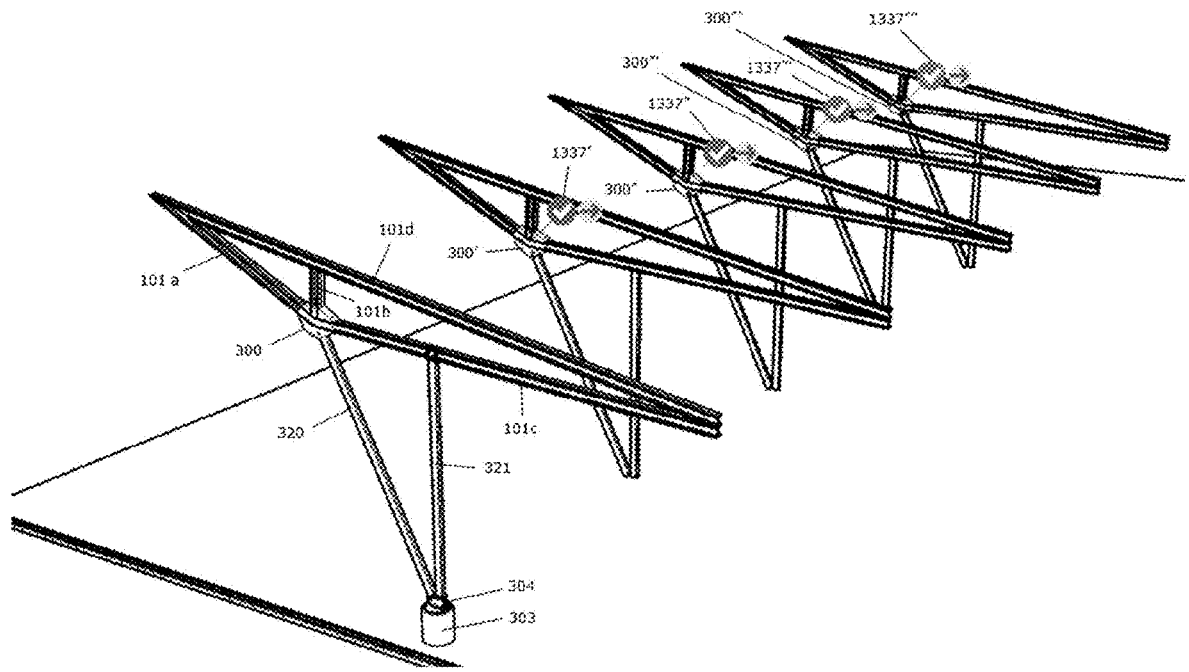
FIGS. 12A and 12B show examples of suggestions to a user of the replication of the detail volumes of FIGS. 8 and 9, respectively.

FIG. 12A shows an example of a two-dimensional pixelated rendering for a visualization means of a BIM comprising several suggestions (1337', 1337'', 1337''', 1337'''') to a user of the replication (300', 300'', 300''', 300'''') of the detail volume (300) of FIG. 8.

Figure 12B:
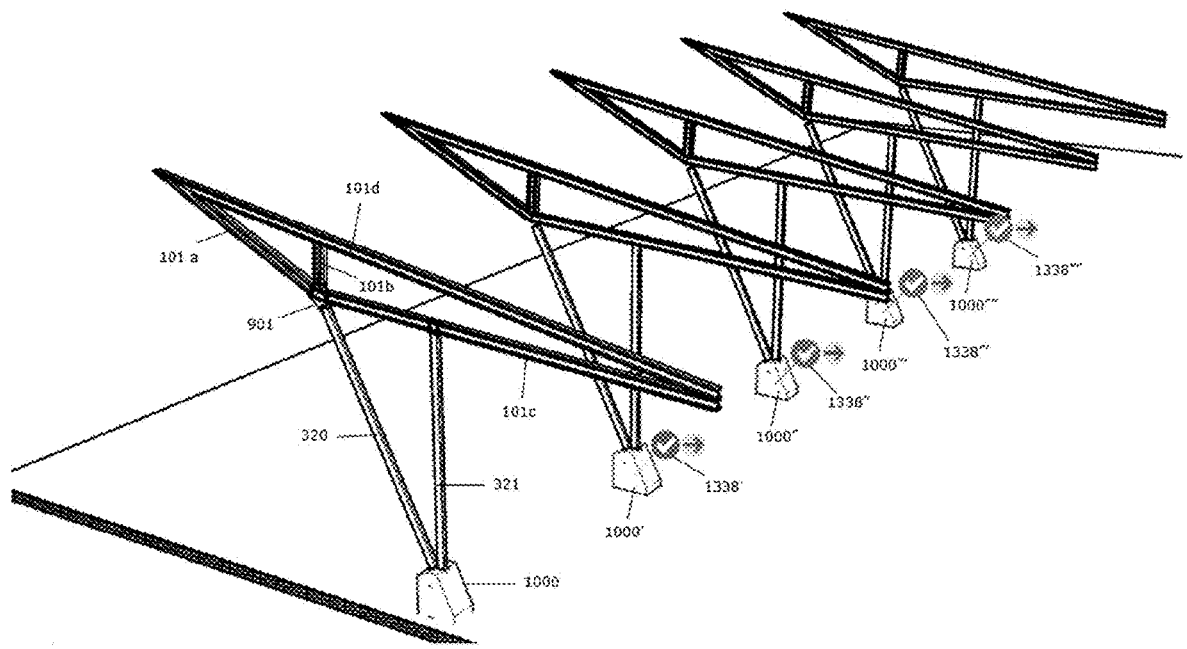

FIG. 12B shows an example of a two-dimensional pixelated rendering for a visualization means of a BIM comprising several suggestions (1338', 1338'', 1338''', 1338'''') to a user of the replication (1000', 1000'', 1000''', 1000'''') of the detail volume (1000) of FIG. 9.

The invention claimed is:

1. A computer-implemented method for detail propagation in a computer-aided design model, comprising the steps of:
    selecting by a user using an input device in a visualization of a rendered reference computer-aided design model a detail and a reference base set comprising a plurality of reference base solids, with the plurality being at least 1;
    computing in the reference computer-aided design model a detail volume to be replicated based on one or more properties of said selected detail and on one or more relative geometric properties of selected reference base set, the detail volume encompassing the detail, the detail volume comprising a surface and for each reference base solid a reference intersection curve of the surface of the detail volume and the reference base solid;
    searching in a target computer-aided design model for a candidate base set by iterating through all possible sets of a plurality of candidate base solids, with the plurality being at least 2, comprising properties compatible with the reference base solids of the reference base set, wherein searching for said candidate base set comprises determining a dimension based on said detail volume; and finding a group of solids whereby all possible pairs of solids of the group comprise a distance smaller than said dimension;
    automatically mapping the detail volume onto the candidate base set via a transformation;
    automatically validating the mapping of the detail volume via the reference intersection curves; and
    suggesting via rendering a visualization to a user, to perform a replication of the detail volume to replace a corresponding volume at the candidate base set according to the validated mapping, or performing the replication.

2. The computer-implemented method according to claim 1, wherein determining said candidate base set comprises:
    constructing a connection graph comprising nodes and edges, each node representing a solid of the target computer-aided design model, each edge connecting two nodes, whereby two nodes are interconnected by an edge if the solids represented by the two nodes comprise a distance smaller than said dimension; and
    identifying a clique in said connection graph, the clique in said connection graph being a set of completely interconnected nodes.

3. The computer-implemented method according to preceding claim 2, further comprising obtaining a tree data structure comprising a spatial index of all solids of the target computer-aided design model, wherein constructing said connection graph comprises the step of performing a spatial query on said tree data structure.

4. The computer-implemented method according to claim 2, wherein:
    each reference base solid comprises a set of reference properties, and
    said searching for said candidate base set further comprises the step of pre-filtering solids of the target computer-aided design model on compatibility with all reference properties of at least one reference base solid.

5. The computer-implemented method according to claim 2, further comprising:
    identifying all cliques of size 2 based on the edges of the connection graph,
    identifying, recursively, a second clique of a first size of at least k≥3 via retrieval of two identified cliques of a second size k−1 which share k−2 nodes and have two non-shared nodes, wherein k represents a size of the clique; and
    verifying that other two non-shared nodes of said clique and second clique are interconnected by an edge in the connection graph.

6. The computer-implemented method according to claim 5, further comprising obtaining a tree data structure comprising a spatial index of all solids of the target computer-aided design model, wherein constructing said connection graph comprises the step of performing a spatial query on said tree data structure.

7. The computer-implemented method according to claim 5, wherein:
    each reference base solid comprises a set of reference properties, and
    said searching for said candidate base set further comprises the step of pre-filtering solids of the target computer-aided design model on compatibility with all reference properties of at least one reference base solid.

8. The computer-implemented method according to claim 1, wherein each reference base solid comprises a set of reference properties, and wherein said searching for said candidate base set comprises the step of pre-filtering solids of the target computer-aided design model on compatibility with all reference properties of at least one reference base solid.

9. The computer-implemented method according to claim 1, wherein:
    said detail volume is three-dimensional; or
    said detail volume is two-dimensional and planar, comprising an extrusion direction perpendicular to the two-dimensional planar detail volume along which the parts of the solids enclosed within the detail volume remain invariant in the extrusion direction over a corresponding extrusion dimension.

10. The computer-implemented method according to claim 1, wherein obtaining said detail volume further comprises:
    obtaining zero, one or more detail objects;
    determining for each reference base solid a reference base detail part;
    determining for each reference base solid a directed bounding box encompassing said reference base solid, the detail objects, and the reference base detail parts;
    determining an intersection of the directed bounding boxes; and
    obtaining said detail volume based on said intersection.

11. The computer-implemented method according to claim 10, wherein:
    a reference base solid further comprises a major axis along which said reference base solid extends into said intersection, and the method comprises adjusting the intersection so that the adjusted intersection comprises a planar reference intersection curve of the surfaces of said intersection and said reference base solid which is perpendicular to said major axis.

12. The computer-implemented method according to claim 1, wherein mapping said detail volume onto the candidate base set further comprises verifying spatial compatibility of the mapped detail volume with a solid other than the plurality of candidate base solids of the candidate base set.

13. The computer-implemented method according to claim 1, wherein automatically mapping the detail volume onto the candidate base set via a transformation comprises:
   determining a one-to-one correspondence between the base solids of the reference and candidate base sets based on compatibility of properties and/or relative geometric properties of the base solids;
   determining a point and direction for each reference base solid; and
   computing the transformation as an iterative sequence of partial transformations, wherein each partial transformation maps the point and direction of a reference base solid onto a corresponding point and direction of the corresponding candidate base solid.

14. The computer-implemented method according to claim 1, further comprising, in between said computing of the detail volume and said searching for said candidate base set:
   storing a file comprising the detail volume and the reference base solids of the reference base set on a non-transitory computer-readable storage medium; and
   associating via user input the stored file with the target computer-aided design model.

15. The computer-implemented method according to claim 1, further comprising:
   automatically generating a set of geometric parameters for the computed detail volume and/or the reference base solids and/or the detail objects; and
   automatically determining numerical values for the geometric parameters based on the candidate base set in order to adapt the detail volume and/or the detail objects for the candidate base set.

16. A computer system for detail propagation in a computer-aided design model, the computer system is configured to perform the computer-implemented method according to claim 1.

17. A non-transitory computer-readable storage medium comprising instructions which, when executed by a computer, cause the computer to carry out the computer-implemented method according to claim 1.

18. The computer-implemented method according to claim 1, wherein:
   each reference base solid comprises a set of reference properties, and
   said searching for said candidate base set further comprises the step of pre-filtering solids of the target computer-aided design model on compatibility with all reference properties of at least one reference base solid.

* * * * *